United States Patent [19]

Daugherty

[11] 4,290,656
[45] Sep. 22, 1981

[54] HYDRODYNAMIC BEARING WITH EXTENDED PRESSURE GRADIENT

[75] Inventor: Thomas L. Daugherty, Arnold, Md.

[73] Assignee: The United States of America as represented by the Secretary of the Navy, Washington, D.C.

[21] Appl. No.: 88,728

[22] Filed: Oct. 26, 1979

[51] Int. Cl.³ ...................... F16C 17/14; F16C 33/22
[52] U.S. Cl. .................................. 308/121; 308/240; 308/DIG. 12
[58] Field of Search ............... 308/121, 122, 238, 239, 308/240, DIG. 12

[56] References Cited

U.S. PATENT DOCUMENTS

| | | | |
|---|---|---|---|
| 2,898,164 | 8/1959 | Patton | 308/238 |
| 2,898,165 | 8/1959 | Patton | 308/239 |
| 3,455,619 | 7/1969 | McGrath | 308/239 |
| 3,497,278 | 2/1970 | Orndorff, Jr. | 308/239 |
| 3,561,830 | 2/1971 | Orndorff, Jr. | 308/238 |
| 3,971,606 | 7/1976 | Nakano et al. | 308/239 |
| 3,993,371 | 11/1976 | Orndorff, Jr. | 308/239 |

FOREIGN PATENT DOCUMENTS 659214  4/1938  Fed. Rep. of Germany ...... 308/239

*Primary Examiner*—Richard R. Stearns
*Attorney, Agent, or Firm*—R. S. Sciascia; William T. Ellis; Kenneth E. Walden

[57] ABSTRACT

An outboard water lubricated marine bearing assembly having a cylindrical housing and a plurality of stave pads disposed about the inner periphery of the housing for slidably supporting a rotatable shaft extending therethrough. The improvement resides in the stave pad design including a cap of elastomeric material facing the shaft defining a resiliently deformable slidable bearing surface conformable to the shaft and supporting it by a force having a pressure profile progressively increasing across substantially the entire width of the bearing surface from leading to trailing edges thereof for greater overall load carrying capacity.

9 Claims, 13 Drawing Figures

HYDRODYNAMIC BEARING WITH EXTENDED PRESSURE GRADIENT

The invention described herein may be manufactured and used by or for the Government of the United States of America for any governmental purpose without the payment of any royalties thereon or therefor.

BACKGROUND OF THE INVENTION

1. Field of the Invention

This invention relates generally to outboard marine bearings and particularly to stave pads wherein the bearing surfaces providing sliding support for a rotatable shaft are contoured or otherwise arranged to have a wider pressure profile for increased load carrying capacity.

2. Brief Description of the Prior Art

There have been considerable development in the use of water lubricated bearings for carrying rotatable shafts such as propeller shafts. Resilient elastomeric bearings commonly formed from rubber have been found especially suitable for this use. They provide the necessary corrosion resistance and function well under slight shaft misalignments. An early type of elastomeric bearing for marine use employed a simple sleeve with its outer surface secured in a housing. Further developments resulted in grooves being provided on the bearing surface to aid distribution of water for lubrication. More recent developments have concerned removable stave pads spaced apart about the inner periphery of a housing and capped with resilient faces of elastomer, such as rubber, for supporting a rotatable shaft. The staves include rigid backing strips usually contoured to a shape adapted for easy fitting into dovetail slots about the inner periphery of the housing. Leading edges of the resilient bearing have been tapered or relieved in some manner for encouraging the entry of lubrication to the bearing surface. Resilient bearing material may wear down under heavy loading from insufficient lubrication, thus presenting a wiping edge at the leading edge of the pad. This prevents entry of water between the bearing and shaft. U.S. Pat No. 2,898,165 illustrates, for example, one method of increasing the flow of lubricant (water) between the resilient bearing surface and the shaft by relieving bearing pressure at the leading edge of the stave pad. This is accomplished by inserting a strip of relatively soft rubber at the leading edge of the pad, or by relieving a portion of the underlying metal backing at the leading edge and increasing the height or thickness of the rubber, thus decreasing its resistance to deformation. The art is replete with ideas directed to enhancing the entry of lubricant between the bearing and shaft.

SUMMARY OF THE INVENTION

The invention is directed to a stave pad, and is particularly concerned with providing a cap of elastomeric material such as rubber facing a rotatable shaft in load carrying relationship. This resilient or compliant material in carrying the load of the rotatable shaft is caused to conform to the surface of the shaft in a manner whereby a reactive supportive force exerted on the shaft is defined by a pressure profile of lubricant which increases progressively substantially across the entire width of the cap from leading to trailing edges for improved load carrying capacity.

Therefore, an object of this invention is to provide an improved stave pad.

It is a further object of this invention to provide an improved stave pad having a resiliently compliant load carrying pad or face adapted to conform under load of a rotatable shaft in a manner for improved pressure distribution across substantially its entire face from leading to trailing edges.

Other objects of the invention will become apparent from consideration of the drawings, specification, and claims defining the invention.

DESCRIPTION OF THE PREFERRED EMBODIMENT

Figure 1:
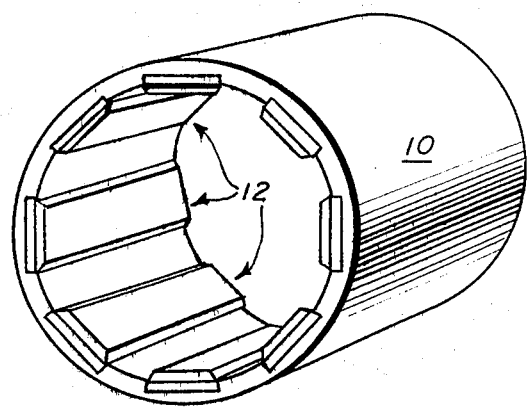
FIG. 1 is a perspective view of a bearing housing carrying a plurality of load carrying stave pads spaced about its inner periphery.

Referring now to the drawings, wherein like reference numerals designate where possible like or corresponding parts throughout the several views, there is shown in FIG. 1 a perspective view of a journal bearing housing 10. A plurality of elongate stave pads 12 are disposed about the inner periphery of the housing for supporting a rotatable shaft, such as a propeller shaft (not shown), extending therethrough. These stave pads, which will later be described in detail in reference to specific embodiments, are preferably removably secured in position on the inner periphery of the housing.

Figure 2:
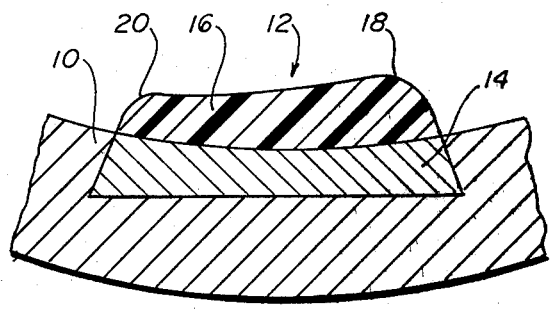
FIG. 2 is a cross-sectional view taken transversely across one of the stave pads showing its profile and attachment to the housing.

FIG. 2 is a cross-sectional view taken transversely of one of the stave pads embodiments illustrating its attachment to housing 10. The stave pads includes a rigid backing member 14 preferably of trapesoidal shape at its back side for locking in a complementary recess in housing 10. Backing member 14 may be formed of metal or any other material providing proper rigid support for a load carrying surface. A cap 16 of resiliently deformable material is bonded or otherwise secured to the front side of backing member 14 for defining an inwardly facing bearing surface for slidably supporting and journalling a rotatable shaft. The top surface of cap 16, as shown in FIG. 2, is contoured to have a greater thickness 18 adjacent its trailing edge than its leading edge 20 for a purpose to be hereinafter described in further detail.

Figure 3:
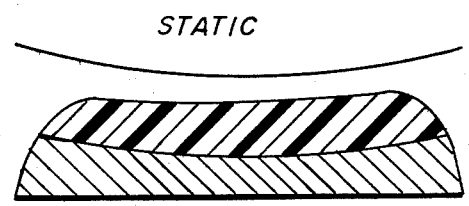
FIG. 3 is a representation of a typical prior art stave pad in cross-section with a shaft illustrated in spaced relation thereabove.
Figure 4:
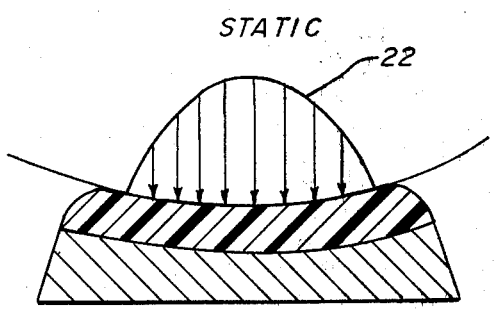
FIG. 4 illustrates pressure distribution across the face of the stave pad illustrated in FIG. 3 when carrying the shaft under non-rotating or static load.
Figure 5:
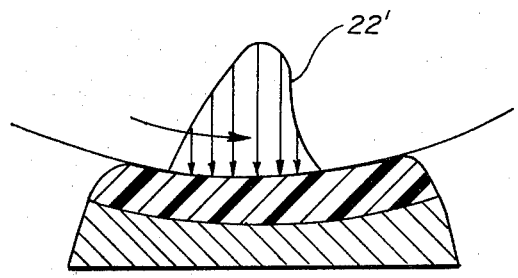
FIG. 5 illustrates pressure distribution across the resilient cap face of the stave bearing of FIG. 4 when carrying the shaft rotating under load.

In FIG. 3 there is shown a typical prior art stave pad with a non-rotating shaft spaced thereabove. When the stave bearing receives the load of the shaft the resilient bearing material is caused to deform generally to the contour illustrated in FIG. 4. The central part of the resilient bearing material is caused to deform to the greatest extent because of its original proximity to the shaft. Force on the face of the cap resilient bearing material is distributed generally according to pressure profile outline 22 with highest pressures at the center and lower pressures to either side thereof. Upon rotation of the shaft under load, the distribution of pressure across the face of the resilient bearing shifts and assumes a profile substantially as illustrated by outline 22' in FIG. 5. The pressure builds up from a leading edge to the center of the pad but drops off sharply after highest pressure is obtained, substantially at the center or midpoint of the cap, and returns to zero pressure, or even a negative pressure, along the latter half of the pad adjacent its trailing edge. The load carrying capacity of this type pad is substantially reduced because pressure is not distributed over the whole bearing face or surface. The generation and maintenance of a hydrodynamic film of lubricant between facing surfaces of a bearing and movable member is dependent upon an angular disposition of their surfaces. A film wedge of lubricant can be retained between a bearing and rotating shaft as long as there is a progressive increase in pressure on the lubricant from the leading edge of the bearing inwardly in the direction of shaft rotation, but once the highest pressure is attained the film begins to diverge and its ability to support load diminishes rapidly. Therefore, the present invention is directed to overcoming the above mentioned deficiency and provide pad arrangements which cause a pressure build up on a lubricant film progressively from a leading edge of the bearing across substantially the entire face or width thereof terminating at its highest pressure adjacent the trailing edge of the bearing. By the arrangements disclosed herein, it will be shown that there is established a wider pressure profile extending over a bearing surface for lower unit pressure, reduced bearing surface wear, and greater load carrying capacity.

Figures 6, 6A:
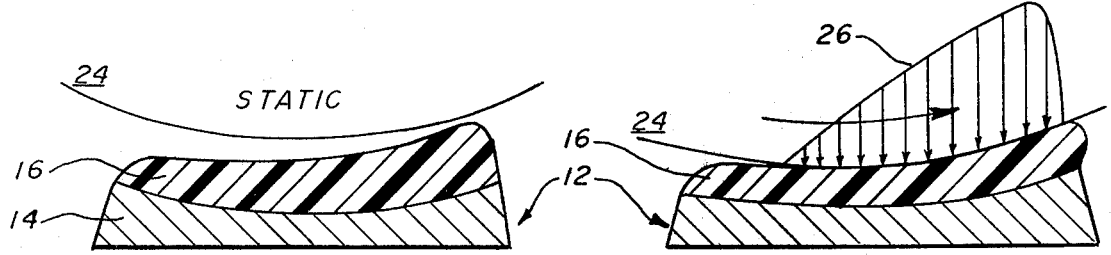
FIG. 6 is a cross-sectional view of one embodiment of a stave pad according to the invention illustrating its face contour in relation to a non-rotating shaft spaced thereabove.
FIG. 6A illustrates deformation and pressure distribution across the resilient face of the stave cap of FIG. 6 when carrying the shaft rotating under load.

The stave pad shown in cross-section in FIG. 6 corresponds substantially to the one briefly described in FIG. 2 to which like numerals are applied. Stave pad 12 comprises an elongate rigid backing member 14 having a trapezoidal shaped base for removable retention in a complementary slot on the inner periphery of housing 10 (not shown). A cap 16 of resiliently compliable or deformable material is bonded or otherwise secured to rigid backing member 14 to define a bearing surface for slidably supporting a rotating shaft. A partial outline of a non-rotating shaft 24 is shown spaced above cap 16 for illustrating the bearing shape in physical relation thereto. The trailing edge of the resilient cap is thicker than the leading edge, and in normal conditions extends higher or closer to the shaft. Therefore, when the bearing and shaft are brought together under operating conditions, resilient cap 16 is caused to conform or flow to the shape illustrated in FIG. 6A. The bearing cap is now substantially the same thickness across its face or width, however, the trailing edge has been compressed more than portions closer to the leading edge, and higher pressures are induced therein. Support of the shaft is represented by pressure profile 26 which progressively increased across substantially the entire face of the cap from leading to trailing edge. Thereby, a wedge of lubricant, not illustrated, decreasing in thickness toward the trailing edge, is retained between the bearing and shaft.

Figures 7, 7A:
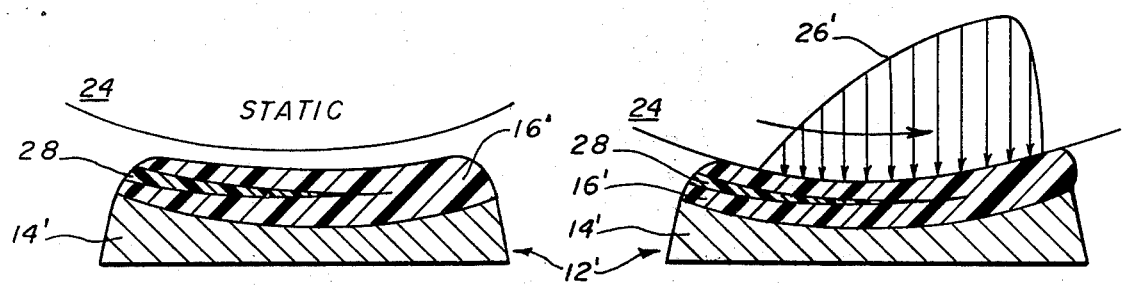
FIG. 7 is a cross-sectional view of another stave pad according to the invention showing its cap face in relation to a non-rotating shaft spaced thereabove.
FIG. 7A illustrates deformation and pressure distribution across the resilient face of the stave cap of FIG. 7 when carrying the shaft rotating under load.

An alternate embodiment of the stave pad, identified by numeral 12', is shown in FIGS. 7 and 7A. A backing member 14', identical to member 14 in FIGS. 6 and 6A, carries a cap 16' of resiliently compliant or deformable bearing material which is substantially the same thickness across its width from leading to trailing edges. A portion of the resilient bearing material, however, is cut away to receive a wedge of soft resilient material 28. The wedge extends from the leading edge across a substantial portion of the cap to near the trailing edge. Non-rotating shaft 24 is again illustrated spaced above the bearing for demonstrating relative position. When shaft 24 is supported on bearing 12' as shown in FIG. 7A, and rotated in the direction indicated by the arrow, very little apparent flow has occured in resilient cap 16'. The resilient or soft wedge 28, however, has partially deformed and therefore that portion of the cap exerts less pressure against the shaft than the portion nearer the trailing edge. The pressure exerted in supporting shaft 24 is illustrated by pressure profile 26' which, like the pressure profile 26 in FIG. 6A, increases progressively from leading to trailing edge across the bearing face. The pressure profile increases in a manner for maintaining a film of lubricant between the bearing surface and shaft.

Figures 8, 8A:
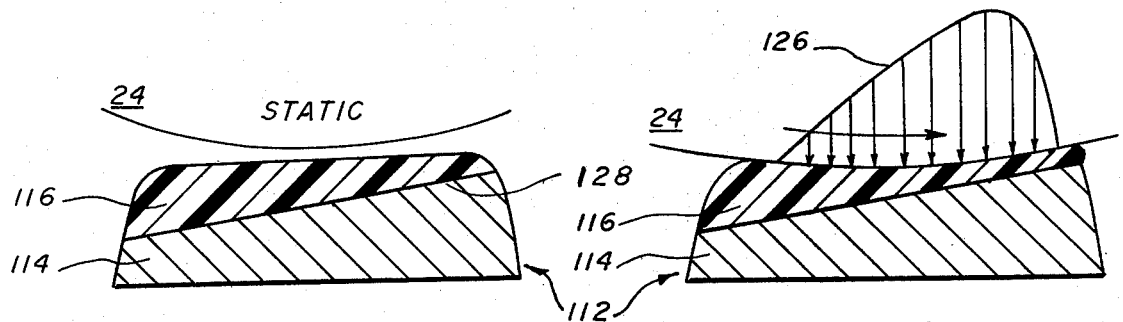
FIG. 8 is a cross-sectional view of still another stave pad according to the invention showing its cap face in relation to a non-rotating shaft spaced thereabove.
FIG. 8A illustrates deformation and pressure distribution across the face of the resilient cap of FIG. 8 when carrying the shaft rotating under load.
Figures 9, 9A:
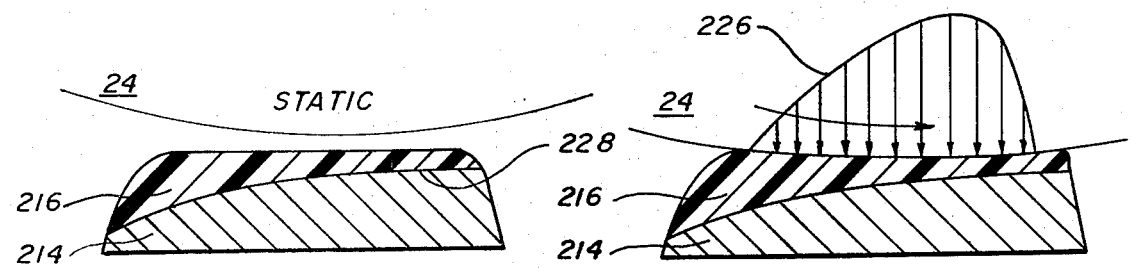
FIG. 9 is a cross-sectional view of yet another stave pad according to the invention showing its resilient cap face in relation to a non-rotating shaft spaced thereabove.
FIG. 9A illustrates deformation and pressure distribution across the face of the resilient cap of FIG. 9 when carrying the shaft rotating under load.

FIGS. 6 and 7 illustrated embodiments wherein an increasing pressure gradient is obtained by specific construction of the resilient cap. FIGS. 8 and 9, on the other hand, illustrate embodiments wherein like results are obtained by selective shaping of the rigid backing members. In FIG. 8, it will be noted that rigid backing member 114 is much thicker at its trailing edge, and the resilient material defining cap 116 is inversely proportioned to present a stave pad with a relatively flat face to non-rotating shaft 24 shown spaced thereover. As shaft 24 is rotated and its load carried by stave pad 112, resilient material in cap 116 is caused to flow as illustrated in FIG. 8A. Since the trailing edge of the resilient material is thinner than the leading edge, it is more resistant to deformation while carrying shaft 24 rotating under load. Greater pressures are induced in the thinner portion, and the shaft is supported according to pressure profile 126.

FIGS. 9 and 9A illustrate yet another embodiment of the stave pad differing from that shown in FIGS. 8 and 8A only in that interface 228 between backing member 214 and cap 216 is slightly curved rather than straight. The prime resultant from the curved interface is a slight change in the pressure profile 226 build-up from one side of the bearing to the other.

Another embodiment not illustrated in the drawings, for controlling pressure profile is to provide a cap of resilient material with increasing hardness across its face from leading to trailing edges.

Stave pads previously described are adapted to operate submerged in seawater from which they are lubricated. The caps of resiliently deformable material defining the bearings for slidably carrying the shaft may be formed from rubber or other elastomeric material compatible with their environment. It is intended that the resilient cap be formed or shaped in cooperation with the rigid backing member in a manner whereby pressure is induced thereon which supports a rotating shaft by a force according to a pressure profile which increases progressively from the leading to trailing edges of the bearing face, thereby encouraging introduction and maintenance of a hydrodynamic wedge of lubricant between opposing surfaces of the bearing and shaft. By this arrangement the pressure profile or footprint is extended over a wide range, resulting in lower unit pressure, less wear on the resilient bearing material, and increased load carrying capacity. Also, lower speeds are obtainable without encountering stick-slip conditions and resulting noise.

It will be understood that the improvement disclosed herein is useful on a bearing designed primarily for a shaft rotating in one direction only. The bearing will be substantially less effective when the shaft is rotating in the other direction. However, ship propeller shafts are seldom called upon for extensive or prolonged reverse rotation. This is a shortcoming of the bearing which applicant willingly concedes in obtaining the substantial improvements disclosed herein.

It is obvious that various modifications and changes can be made to the disclosure herein without departing from the spirit of the invention which is defined and limited only by the scope of the claims appended hereto.

What is claimed is:

1. A water lubricated marine bearing comprising:
    a housing having a cylindrical opening therethrough and a plurality of stave pads annularly disposed about the opening for carrying a rotatable shaft extending therethrough;
    each stave pad including a rigid backing member adapted to be secured to the housing and a cap of resiliently deformable material facing inwardly defining a sliding load bearing surface for the rotatable shaft;
    each stave pad including means extending thereacross substantially from its leading edge to its trailing edge whereby the resilient cap in carrying the shaft is conformed across substantially its entire width to the curvature of the shaft and has pressure induced therein which reacts against the shaft as a force defined by a pressure profile which increases progressively across substantially the entire face of the resilient cap from leading edge to trailing edge for aiding the maintenance of a wedge of water lubricant between the cap and rotating shaft.

2. The invention according to claim 1 wherein the means is included in the resilient cap.

3. The invention according to claim 2 wherein the means is defined by the face contour of the cap.

4. The invention according to claim 3 wherein the face contour of the resilient cap in unloaded condition rises progressively from adjacent its leading to trailing edge in a direction generally toward the housing axis whereby under shaft loading the resilient cap is stressed progressively greater from leading to trailing edge.

5. The invention according to claim 1 wherein the means includes a rigid backing member which progressively increases in thickness from its leading edge to its trailing edge and a resilient cap which progressively decreases in thickness from its leading edge to its trailing edge whereby under shaft load deformation greater pressures are induced in the resilient cap substantially progressively across the entire face thereof.

6. The invention according to claim 1 wherein the means comprises a resilient cap having thickness progressively decreasing from adjacent its leading edge toward its trailing edge whereby greater pressures are generated therein progressively toward its trailing edge resulting from equal displacement from shaft loading.

7. In a water lubricated marine bearing assembly having a cylindrical housing with a plurality of stave pads annularly disposed about the inner periphery thereof for carrying a rotatable shaft extending therethrough, the improvement residing in the stave pads;
    each stave pad having a rigid backing member adapted for attachment to the housing and a cap of resiliently deformable material facing the shaft and defining a bearing for slidably supporting the shaft;
    each stave pad including means extending thereacross substantially from its leading edge to its trailing edge whereby when the resilient cap is deformed under load of the shaft to the curvature of the shaft surface it exerts a reactive supporting force against the shaft according to a pressure profile extending substantially the entire face of the resilient cap progressively increasing substantially from leading to trailing edges for aiding the retention of a wedge of water lubricant between the cap and rotating shaft.

8. A water lubricated marine bearing comprising:
    a housing having a cylindrical opening therethrough and a plurality of stave pads annularly disposed about the opening for carrying a rotatable shaft extending therethrough;
    each stave pad including a rigid backing member adapted to be secured to the housing and a cap of resiliently deformable material facing inwardly defining a sliding load bearing surface for the rotatable shaft;
    said cap of resiliently deformable material being progressively thicker from adjacent its leading edge to its trailing edge where it projects closer to the shaft; whereby in conforming to the curvature of the shaft under load the material has pressures induced therein which react against the shaft surface as a force defined by a pressure profile which increases progressively across substantially the entire face of the cap for aiding the maintenance of a wedge of lubricant between the shaft surface and cap.

9. A water lubricated marine bearing comprising:
    a housing having a cylindrical opening therethrough and a plurality of stave pads annularly disposed about the opening for carrying a rotatable shaft extending therethrough;
    each stave pad including a rigid backing member adapted to be secured to the housing and a cap of resiliently deformable material facing inwardly defining a sliding load bearing surface for the rotatable shaft;

said cap of resiliently deformable material including a wedge of relatively softer material sandwiched therein between the rigid backing member and its face;

said wedge shaped material diminishing in thickness from adjacent a leading edge of the cap toward a trailing edge thereof;

whereby the cap is conformed across substantially its entire width to the curvature of the shaft under load and has pressure induced therein which reacts against the shaft as a force defined by a pressure profile which increases progressively across substantially the entire face of the cap from leading edge to trailing edge for aiding the maintenance of a wedge of lubricant between the shaft surface and cap.

* * * * *